Oct. 18, 1960  D. G. CARLSON  2,957,119
REGULATED D.C. POWER SUPPLIES OR THE LIKE
Filed April 21, 1954
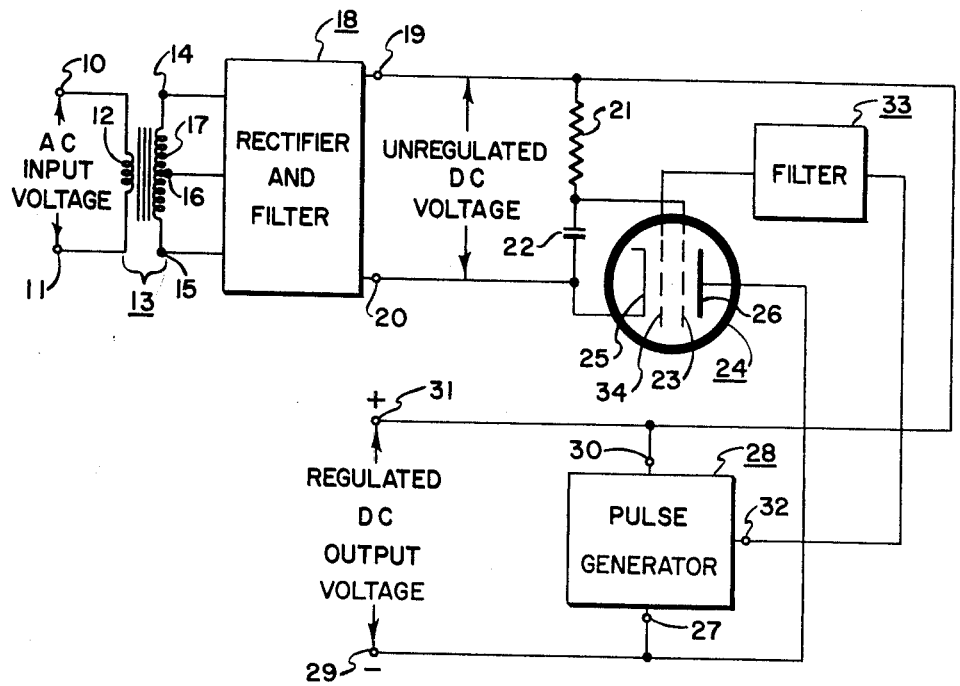
DAVID G. CARLSON
INVENTOR.
BY
HIS ATTORNEY

United States Patent Office 2,957,119
Patented Oct. 18, 1960

2,957,119

REGULATED D.C. POWER SUPPLIES OR THE LIKE

David G. Carlson, San Fernando, Calif., assignor to Hoffman Electronics Corporation, a corporation of California Filed Apr. 21, 1954, Ser. No. 424,701

3 Claims. (Cl. 321—18)

This invention is related to regulated D.C. power supplies and, more particularly, to an improved D.C. power supply which will exhibit optimum reliability.

In the past, many attempts have been made to design satisfactory regulated D.C. power supplies. Invariably certain problems are encountered which render regulated D.C. power supply circuits presently in use deficient in some respects. Difficulties center in the fact that cascaded D.C. amplifiers, presently employed in conventional regulated low-impedance D.C. power supplies, are subject to operating point variations and associated operational difficulties, and also are characterized by stability problems. Also, for certain applications it is desirable to have the power supply series regulator tube in the negative output lead, which has been heretofore impossible in conventional regulated D.C. power supply circuits by reason of common ground considerations unless a separate voltage source is employed to supply bias for the regulator tube.

Therefore, it is an object of this invention to provide an improved regulated D.C. power supply.

It is a further object of this invention to provide an improved regulated D.C. power supply which will exhibit optimum reliability.

It is an additional object of this invention to provide an improved regulated D.C. power supply circuit which will permit the location of the series regulator tube in either the positive or negative output lead, as desired.

According to this invention a pulse generator and filter network are operated by, and are responsive to variations in the unregulated D.C. output voltage of a conventional power supply resulting in the production of pulses the average value of which is proportional to such voltage variations. These pulses serve to control a series regulator tube in the negative or positive output leads of the power supply. Owing to the fact that known pulse techniques allow for the generation of pulses of large magnitude variation in response to only relatively small variations of applied voltage, the employment of cascaded D.C. amplifiers and stability problems associated therewith are avoided.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which the sole figure is a schematic diagram of a regulated D.C. power supply according to this invention.

In the sole figure, alternating current input voltage terminals 10 and 11 are connected across primary winding 12 of transformer 13. End-terminals 14 and 15 and center tap 16 of secondary winding 17 are connected to the input circuitry of rectifier and filter stage 18. Output terminals 19 and 20 of rectifier and filter stage 18 are connected across an R–C circuit composed of resistor 21 and capacitor 22. The junction of resistor 21 and capacitor 22 is connected to screen grid 23 of series regulator tube 24. Output terminal 20 is also connected to cathode 25 of regulator tube 24. Anode 26 of regulator tube 24 is connected to terminal 27 of pulse generator stage 28 and also to negative output terminal 29. In addition to being connected to one end of resistor 21, terminal 19 is connected to terminal 30 of pulse generator stage 28 and also to positive output terminal 31. Output terminal 32 of pulse generator stage 28 is coupled through filter 33 to control grid 34 of series regulator tube 24.

The circuit of the sole figure operates as follows. A conventional D.C. power supply, composed of transformer 13 and rectifier and filter stage 18, produces an unregulated D.C. voltage between terminals 19 and 20. For purposes of illustration, series regulator tube 24 has been placed in the negative output lead connecting to output terminal 29. Regulator tube 24 might also have been placed in the positive output lead connecting to output terminal 31, if so desired. Resistor 21 and capacitor 22 serve as a screen voltage dropping resistor and capacitive filter, respectively, for screen grid 23 of regulator tube 24. While a tetrode tube has been chosen to serve as a series regulator tube in the present embodiment of this invention, a triode or pentode tube might also have served. The heart of the invention lies in the combination of pulse generator stage 28 and filter 33 and their coupling to control grid 34 of series regulator tube 24. Known pulse techniques permit the design of a pulse generator 28 so that, in the presence of variations in voltage between terminals 19 and 20, the magnitude, pulse width, and/or pulse repetition frequency of the generated pulses will vary in response to variations in unregulated input voltage. For example, a blocking oscillator generates a pulse train the pulse repetition frequency of which is dependent upon applied voltage; a plate-coupled multivibrator generates a pulse train the pulse width and pulse magnitude of which are jointly dependent upon applied voltage. Whether the design of the pulse generator is such as to produce pulse trains the pulse magnitude, pulse width, or pulse repetition frequency of which are responsive to such variation in unregulated D.C. input voltage, the average value of pulse generator output voltage when passed through filter 33 will control series regulator tube 24 so as to make the conductance of regulator tube 24 dependent and roughly proportional to variations in the unregulated D.C. supply voltage between terminals 19 and 20.

In actual practice, pulse generator stage 28 may well include a single D.C. amplifier stage, to provide sufficient feedback loop gain, followed by a clamping circuit, to provide a common voltage reference level. Such inclusion, however, will still not render the regulated power supply circuitry susceptible to oscillation as in the case of employment of several cascaded D.C. amplifiers; and in addition, such a regulated power supply will be characterized far more by a desired low-impedance output than would a D.C. amplifier employing a cascade of comparable stages.

By appropriate circuit revision the series regulator tube may be placed in the positive lead rather than in the negative lead as shown in the sole figure.

While particular embodiments of the present invention have been shown and described, it will be obvious to those skilled in the art that changes and modifications may be made without departing from this invention in its broader aspects, and, therefore, the aim in the appended claims is is to cover all such changes and modifications as fall within the true spirit and scope of this invention.

I claim:

1. A regulated D.C. power supply including, in combination, a plurality of input terminals for coupling to an alternating current voltage source, a rectifier and filter stage having an input circuit and a plurality of output terminals, a transformer having a primary winding and a secondary winding with a center tap, said primary winding of said transformer being coupled to said plurality of said input terminals, said secondary winding and said center tap of said transformer being coupled to said input circuit of said rectifier and filter stage, a pulse generator having a plurality of input terminals, a first input terminal of said pulse generator being coupled to a first output terminal of said rectifier and filter stage, a plurality of output terminals, a first output terminal of said plurality of output terminals being coupled to said first input terminal of said pulse generator stage, a vacuum tube having anode, cathode, and control electrodes, said anode electrode of said vacuum tube being coupled to a second input terminal of said pulse generator and also to a second output terminal of said plurality of output terminals, said cathode electrode of said vacuum tube being coupled to a second output terminal of said rectifier and filter stage, a filter having a plurality of terminals, a first terminal of said filter being coupled to said control grid of said vacuum tube, and a second terminal of said filter being coupled to said output terminal of said pulse generator.

2. A voltage regulator for delivering a predetermined constant D.C. voltage at a pair of load terminals comprising, a pair of input terminals for connection to a direct current supply source, a variable impedance device in series between an input and a load terminal, conductive means connecting the other input and load terminals, means responsive to the voltage at the load terminals for generating a train of discrete unidirectional pulses having a pulse repetition rate varying in accordance with the magnitude of the instantaneous voltage at the load terminals, an averaging filter coupled to the output of said pulse generating means for producing a continuous voltage of a magnitude proportional to the average value of the pulses of the train, and means responsive to the continuous voltage at the filter output for varying the value of the impedance device in accordance with variations of the voltage at the load terminal from the predetermined voltage.

3. A voltage regulator for delivering a predetermined constant D.C. voltage at a pair of load terminals comprising, a pair of input terminals for connection to a direct current supply source, a variable impedance device in series between an input and a load terminal, conductive means connecting the other input and load terminals, means responsive to the voltage at the load terminals for generating a train of discrete unidirectional pulses having a pulse width varying in accordance with the magnitude of the instantaneous voltage at the load terminals, an averaging filter coupled to the output of said pulse generating means for producing a continuous voltage of a magnitude proportional to the average value of the pulses of the train, and means responsive to the continuous voltage at the filter output for varying the value of the impedance device in accordance with variations of the voltage at the load terminal from the predetermined voltage.

References Cited in the file of this patent

UNITED STATES PATENTS

| | | |
|---|---|---|
| 1,987,976 | Roberts | Jan. 15, 1935 |
| 2,579,223 | Baker | Dec. 18, 1951 |
| 2,721,977 | Rich | Oct. 25, 1955 |
| 2,810,105 | Henrich | Oct. 15, 1957 |

OTHER REFERENCES

"An Inductively Coupled Series Tube D.C. High Voltage Regulator," by R. Pepinsky and P. Jarmotz, The Review of Scientific Instruments (April 1948), pages 247–254 relied on.